United States Patent [19]

Steilen et al.

[11] Patent Number: 5,844,015
[45] Date of Patent: Dec. 1, 1998

[54] PROCESS AND DEVICE FOR CONTINUOUS PRODUCTION OF POLYURETHANE BLOCK FOAM

[75] Inventors: Herbert Steilen, Königswinter; Reiner Raffel, Siegburg; Robert Eiben; Wilfried Ebeling, both of Köln, all of Germany

[73] Assignee: Maschinenfabrik Hennecke GmbH, Leverkusen, Germany

[21] Appl. No.: 979,255

[22] Filed: Nov. 26, 1997

Related U.S. Application Data

[63] Continuation of Ser. No. 732,550, Oct. 15, 1996, abandoned.

[30] Foreign Application Priority Data

Oct. 20, 1995 [DE] Germany ............ 195 39 072.5

[51] Int. Cl.$^6$ .................................. C08G 18/04
[52] U.S. Cl. ................ 521/155; 264/458; 264/46.2; 264/50; 264/53; 425/4 C; 425/817 R
[58] Field of Search ............... 264/45.8, 46.2, 264/50, 53; 521/155; 425/4 C, 817 R

[56] References Cited

U.S. PATENT DOCUMENTS

| | | | |
|---|---|---|---|
| 3,184,419 | 5/1965 | Merriman . | |
| 4,906,672 | 3/1990 | Stone et al. | 521/130 |
| 5,120,770 | 6/1992 | Doyle et al. | 521/99 |
| 5,375,988 | 12/1994 | Klahre | 264/46.2 |
| 5,578,655 | 11/1996 | Fiorentini | 521/155 |
| 5,582,840 | 12/1996 | Pauw et al. | 264/46.2 |

FOREIGN PATENT DOCUMENTS

| | | |
|---|---|---|
| 2127475 | 1/1995 | Canada . |
| 803771 | 10/1958 | United Kingdom . |

OTHER PUBLICATIONS

Becker/Braun: Kunststoffhandbuch, vol. 7, (Month unavailable) 1993, pp. 147–152.

Primary Examiner—John M. Cooney, Jr.
Attorney, Agent, or Firm—Joseph C. Gil; Noland J. Cheung

[57] ABSTRACT

A process and a device are described for the production of polyurethane foam by application of a froth onto the conveyor belt of a block-foam installation, whereby the froth is applied onto the lower conveyor belt in a free, substantially vertical fall and flowing of the froth contrary to the direction of movement of the conveyor belt is prevented by a stationary, substantially vertical barrier arranged transversely on the conveyor belt.

2 Claims, 4 Drawing Sheets

PROCESS AND DEVICE FOR CONTINUOUS PRODUCTION OF POLYURETHANE BLOCK FOAM

This application is a continuation of application Ser. No. 08/732,550 filed Oct. 15, 1996 which is now abandoned.

BACKGROUND OF THE INVENTION

In the continuous production of polyurethane block foam, a foaming agent and the reaction components for the polyisocyanate-polyaddition reaction (isocyanate and polyol) are mixed in a mixing head. After the reaction components are mixed, they are applied from the mixing head onto the conveyor belt of a block-foam installation, wherein the reaction mass is caused to foam, is hardened and cut into blocks. This technology is described in *Becker/Braun: Kunststoffhandbuch*, Vol 7, 1993, pages 148 and 149.

For a foaming agent, the process has been suggested whereby carbon dioxide is dissolved under pressure in one of the components in the reactive mixture or prior to production of the reactive mixture. After the relaxation of the pressure, the carbon dioxide is released in the form of small gas bubbles in the reactive mixture (formation of froth) (GB-A 803,771, U.S. Pat. No. 3,184,419, U.S. Pat. No. 4,906,672, U.S. Pat. No. 5,120,770, EP-A 645,226). In this connection, it is possible for water to be employed as an additional foaming agent, whereby $CO_2$ is additionally released through the reaction of the isocyanate with the water.

The froth, which is generated by means of $CO_2$ and is dissolved under pressure, emerges from the expansion mechanism, which is connected downstream of the mixing unit at a relatively high speed of 0.5 to 5 m/s in comparison with the speed of the conveyor belt (4 to 8 m/min). Conventional foaming agents such as fluorocarbons or low-boiling hydrocarbons differ by being released only because of the rise in temperature that occurs in the course of a progressive reaction. The froth has a relatively low flowability in comparison with the non-foamed reactive mixture. In the case of the block dimensions, which are presently desired at a width of 1.80 to 2.50 m, considerable problems result in the distribution of the froth over the width of the conveyor belt.

According to EP-A 645,226, a design has already been suggested wherein the expansion mechanism is connected downstream of the mixing unit such that it is extended at a right angle to the conveyor belt in accordance with the width of the conveyor belt. A foaming cavity is connected to the expansion mechanism, wherein the foaming cavity is extended correspondingly at a right angle to the conveyor belt. Additionally, the froth emerges substantially parallel to the direction of the conveyor belt, whereby a reduction in the flow rate of the froth results in the foaming cavity. In such a device, a transverse distribution of the froth on the conveyor belt may not occur, since the froth is already deposited on the conveyor belt in a geometry corresponding to the conveyor belt. It has been proven to be a disadvantage that the froth within the foaming cavity moves in contact with relatively large rigid surfaces and is sheared in the vicinity of these surfaces, so that foam bubbles in contact with the boundary surfaces of the foaming cavity are destroyed, causing the generated block foam to exhibit undesirable cavities and an uneven foam structure. In particular, cavities that are generated on the lower boundary surface and within the foaming cavity due to destruction of foam bubbles, may no longer be released but may penetrate into the foam mass, such that the cavities are retained in the course of solidification of the foam.

According to a previously unpublished suggestion by the Applicant, the froth, which is generated in an expansion device that is symmetrical and in the shape of a circle, i.e., not extended at a right angle to the conveyor belt, is introduced, falling freely in a substantially vertical manner, into a trough. Such a trough is formed at a right angle to the conveyor belt and has walls that move in the direction of flow of the froth. On the side of the expansion device, which is situated in the direction of movement of the conveyor belt, the trough is formed by the upper lining foil which is supplied in a substantially vertical manner via a deflection roller. On the side of the expansion device which is situated in the direction contrary to the direction of movement of the conveyor belt, the trough is formed by an auxiliary foil which is supplied in a substantially vertical manner and is led away in sliding contact with the lower lining foil via a deflection roller. The disadvantage with this type of arrangement is the congestion that is generated in the trough which, until the froth passes beneath the deflection roller for the upper lining foil, forces the froth into a pure transverse movement. Additionally, another disadvantage is the shearing of the froth that is brought about in the region of the sliding contact between the auxiliary foil and the lower lining foil.

As a result, the above-stated disadvantages are overcome by the present invention.

SUMMARY OF THE INVENTION

The subject of the present invention is a process for the production of polyurethane foam by application of a froth onto a conveyor belt of a block-foam installation. The process is characterized in that the froth is applied onto a conveyor belt which is located below, in a free and substantially vertical fall. Any flowing of the froth, which is contrary to the direction of movement of the conveyor belt, is prevented by a stationary, substantially vertical barrier arranged transversely on the conveyor belt.

The froth is generated by the combination of a foaming agent, which is gaseous at room temperature and at ambient pressure, by the reaction components being supplied to a mixing unit and by the reaction mixture. The foaming agent is dissolved under pressure in at least one of the components of the polyisocyanate-polyaddition reaction. The reaction mixture, which contains the foaming agent dissolved under pressure, is expanded continuously under ambient conditions in an expansion unit (pressure-reducing unit) and is subject to the release of the dissolved foaming agent in the form of fine gas bubbles.

DETAILED DESCRIPTION OF THE INVENTION

Figure 1:
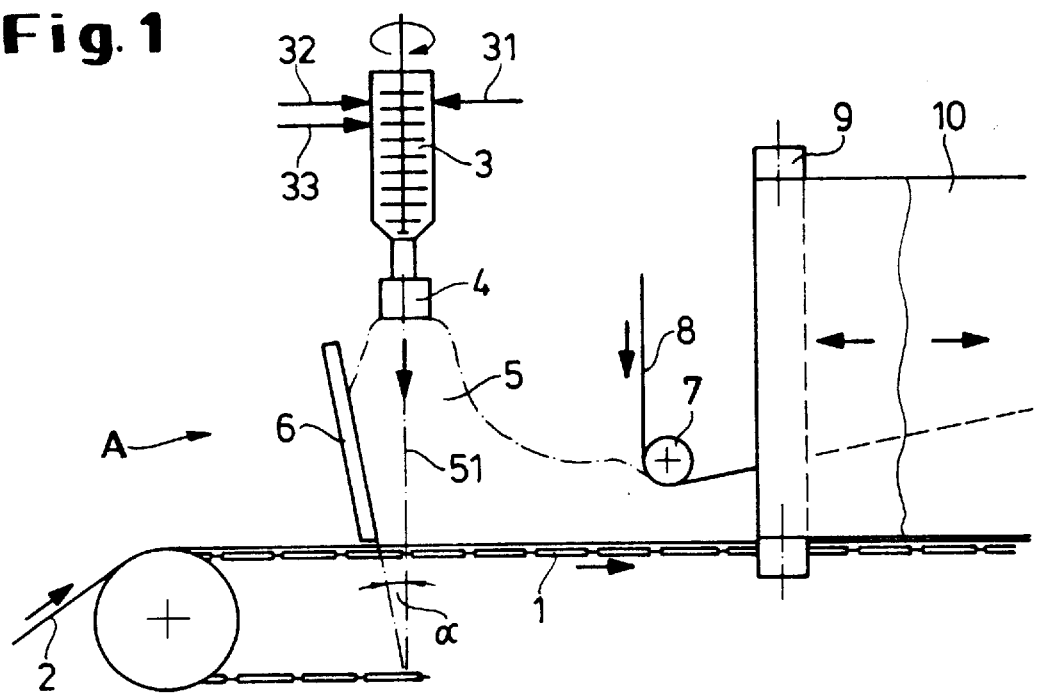
FIG. 1 shows, in schematic side view, a device for implementing the process according to the present invention.

In the present invention, a process for the production of polyurethane foam by application of a froth onto a conveyor belt of a block-foam installation is described. The process is characterized in that the froth, which is in a free and a substantially vertical fall, is applied onto a conveyor belt located below. Any flowing of the froth, which is contrary to the direction of movement of the conveyor belt, is prevented by a stationary, substantially vertical barrier arranged transversely on the conveyor belt.

The froth is generated by a foaming agent, which is gaseous at room temperature and at ambient pressure, by the reaction components being supplied to a mixing unit and by the reaction mixture. The froth is dissolved under pressure in at least one of the components of the polyisocyanate-polyaddition reaction, preferably, the polyol component. The reaction mixture, which contains the foaming agent dissolved under pressure, is expanded continuously under ambient conditions in an expansion unit (pressure-reducing unit) and is subject to the release of the dissolved foaming agent in the form of fine gas bubbles. In a preferred embodiment, the foaming agent is $CO_2$.

A suitable pressure-reducing unit is one having one or more holes for the passage of the reaction mixture having a small cross-section in at least one dimension, e.g., passage gaps or bores with a diameter of between 0.03 and 0.2 mm. These holes provide a sufficiently high resistance to the passage of the reactive mixture so that a pressure is maintained upstream of the expansion unit, which is sufficient to keep the foaming agent in solution. Preferably, the pressure-reducing unit consists of one or more plates having a plurality of bores with a diameter of 0.05 to 0.15 mm. In the case where several perforated plates are used in series, the plates should have a small spacing such that substantially no formation of foam bubbles can occur between the perforated plates by reason of the relaxation time during which the dissolved foaming agent is released. It is particularly preferred that the pressure-reducing unit consists of one or more perforated plates with a free passage area of all the holes in the amount of 0.5 to 5% (pressure-maintaining sieve plates) and also an additional perforated plate with a free passage area of all the holes in the amount of 8 to 30% (speed-reducing plate). The larger free cross-sectional area of the speed-reducing plate preferably results in a number of passage bores that is correspondingly higher by a factor of 5 to 20. Such a pressure-reducing unit is described in the previously unpublished suggestion by the Applicant according to DE-A 195 24 434.6.

The outlet opening is preferably arranged centrically above the conveyor belt and comprises an extension at a right angle to the direction of the conveyor belt amounting to 5 to 20%, preferably 7 to 10%, of the width of the conveyor belt.

Preferably, the pressure-reducing unit has a circular outlet cross-section, such that the disturbances which may arise by reason of the contact of the froth with the edge of the outlet are kept small. As a result of the contact between the atmosphere with the periphery of the flow of froth that falls freely in substantially vertical manner, disturbances that nonetheless, arise by reason of the agglomeration of foam bubbles on the edge of the outlet of the pressure-reducing unit, are eliminated. Such disturbances are eliminated because of the bursting of the large bubbles that have been formed by agglomeration on the edge of the outlet.

For reasons of mechanical stability, it may, however, be necessary to design the outlet opening of the foaming device, i.e., the sieve plates, by extending it in an elongated manner if the forces acting upon the sieve plate in the case of a circular cross-section become too great.

The flow of froth, which may have a speed of 0.5 to 5 m/sec, preferably 0.5 to 2 m/sec, falls towards the conveyor belt in a substantially vertical manner from a height of 40 to 80 cm above the lower conveyor belt. A slight inclination of the flow of froth in the direction of the conveyor belt of, for example, 20°, may also be advantageous.

To avoid the spreading out of a heap of froth on the conveyor belt contrary to the direction of movement of the conveyor belt, a substantially vertical barrier, e.g., in the form of a flat plate, is arranged across the conveyor belt. With respect to the direction of the conveyor belt, the foot of the plate is preferably located slightly rearward of the point of intersection of the axis of the flow of froth with the conveyor belt. The barrier may be inclined by an angle $\alpha$ of up to 30°, preferably only up to 20°, to the perpendicular to the conveyor belt, contrary to the direction of movement of the conveyor belt.

Preferably, the barrier consists of a material that is not moistened by the polyurethane reaction mixture or with difficulty, is only moistened, or is at least coated with such a material. Suitable materials are polyethylene, polytetrafluoroethylene or silicone.

Of course, due to the relative speeds arising, in particular, in the region in which the froth comes up against the barrier, the contact surface between the barrier and the froth constitutes a disturbance and results in agglomeration of foam bubbles. In other words, formation of larger bubbles or cavities can occur. Surprisingly, such large bubbles and cavities are not observed in the finished foam. Evidently, larger bubbles and cavities forming on the substantially vertical barrier may adhere, continue growing and, when a sufficient size has been attained, rise along the barrier contrary to, or at least at a right angle to, the direction in which the froth slides down and leaves the froth.

The heap of froth, which forms as a result of impingement of the flow of froth, spreads out in a free-flowing manner and in a direction at a right angle to the direction of the conveyor belt and on the side situated opposite the barrier, by reason of the force of gravity and the flowability of the froth.

The barrier may be buckled or bent in the direction of the conveyor belt on both sides proceeding from the center of the conveyor belt. However, the froth which flows away transversely on the barrier should be compelled to be no faster than the speed of the conveyor belt in the direction of the conveyor belt. In particular, the barrier should form on both sides an angle of less than 20°, preferably less than 10°, with the direction at a right angle to the movement of the conveyor belt.

With a view to further transverse distribution of the froth over the conveyor belt at a distance from the supply-point of the flow of froth, a roller which is dipped in the froth and which extends across the conveyor belt may be provided. The upper lining foil is supplied via the roller and is subject to deflection. The spacing of the roller in the direction of the conveyor belt from the axis of the flow of froth, which is supplied in a substantially vertical manner, should preferably amount to at least one third of the width of the conveyor belt. It is particularly preferred for the supply and deflection roller for the upper lining foil to be arranged approximately at a point on the conveyor belt where the polyisocyanate-polyaddition reaction sets in noticeably (where the foam begins to rise), i.e., in the case in which water by way of a chemical foaming agent is In FIG. 1, the conveyor belt 1 of a block-foam installation is represented by a side view. A lower lining foil 2 is supplied to the conveyor belt 1, wherein the lining foil is moved to the right with the conveyor belt at a speed of 3 to 7 m/min. Isocyanate 31 and polyol 32, which may contain 3 to 7 wt % carbon dioxide in dissolved form, are supplied to the mixing unit 3 under pressure, as well as further additives and auxiliary substances 33. In the mixing unit, a pressure prevails, which lies above the saturated vapor pressure of the dissolved carbon dioxide. The reaction mixture is supplied from the mixing unit 3 to the pressure-reducing unit 4, from which the reaction mixture emerges flowing freely, subject to foaming in the form of froth 5, in the direction of the dot-dashed line 51. The substantially vertical, plate-shaped barrier 6 prevents the froth 5 from spreading out contrary to the direction of movement of the conveyor belt 1. To avoid the intake of air between the lower lining foil 2 and the lower edge of the barrier 6, the lower edge of the barrier 6 rests in sliding contact on the lower lining foil 2. The barrier 6 is preferably retained such that it is displaceable in the longitudinal direction of the conveyor belt and rotatable about an axis at a right angle to the conveyor belt so that the placement of the barrier 6 can be optimized during production. At a distance from the supply-point of the froth 5, the upper lining foil 8 is supplied in the direction of movement of the conveyor belt via a deflection roller 7 which is dipped in the froth 5. Furthermore, on both sides of the conveyor belt, lateral lining foils 10 are supplied via deflection rollers 9.

Figure 2:
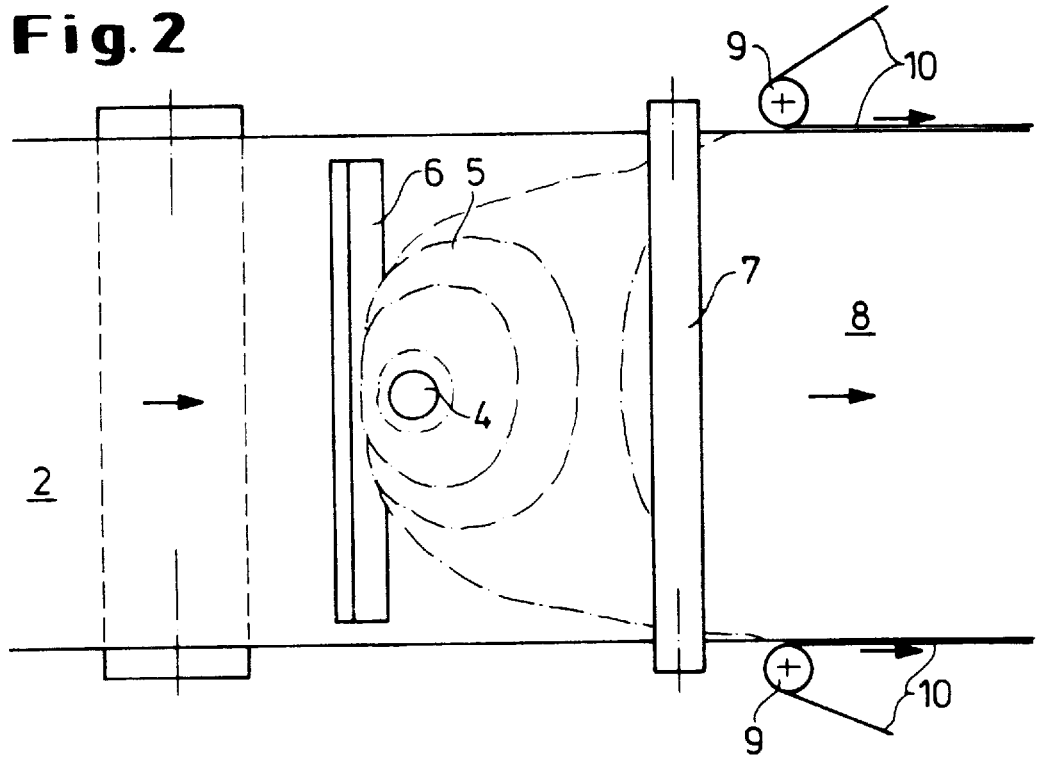
FIG. 2 shows a schematic top view of the device according to FIG. 1.

In the view shown in FIG. 2, which is the top view of the device according to FIG. 1, the same reference numbers in FIG. 2 denote the same elements as in FIG. 1.

Figure 3:
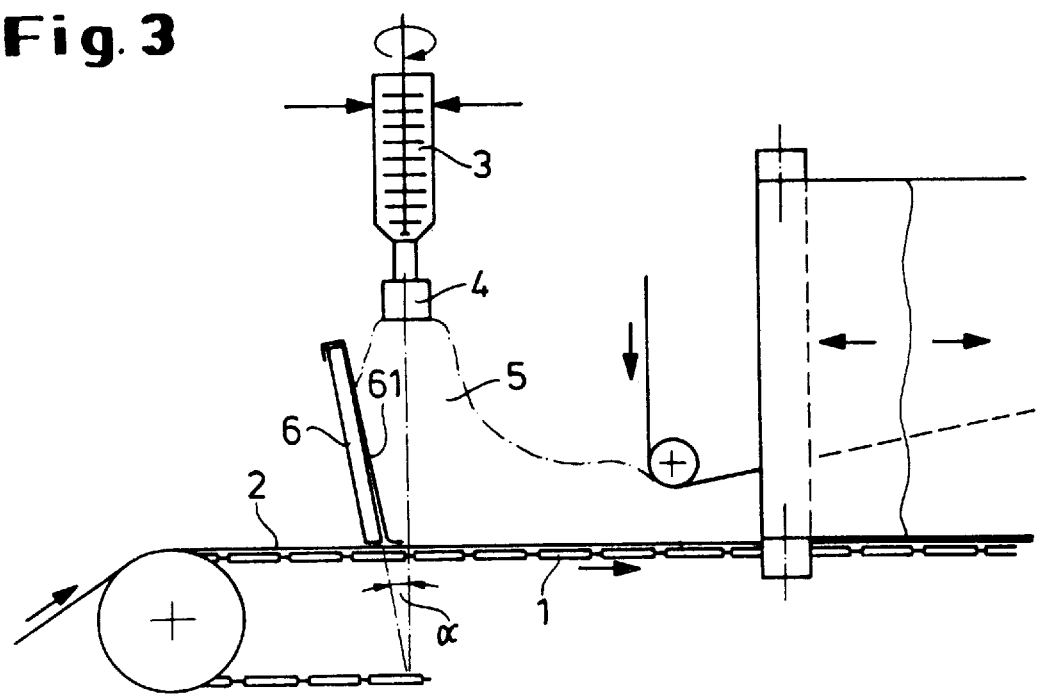
FIG. 3 shows an alternative embodiment of the device according to FIG. 1.

In FIG. 3, the barrier plate 6 is covered by a polyethylene foil 61, which is not capable of being moistened by the polyurethane reaction mixture and which can be easily replaced during production stoppages.

Figure 4:
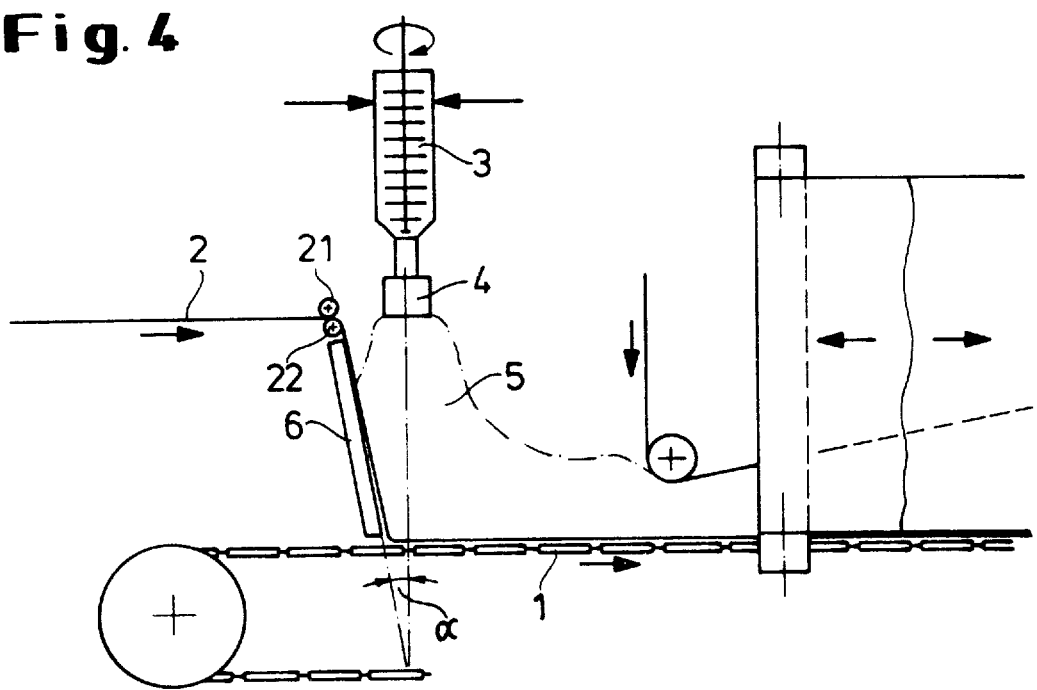
FIG. 4 shows a device according to FIG. 1 with an alternative supply of the lower lining foil.

In the representation according to FIG. 4, the lower lining foil 2 is supplied in a sliding manner via the barrier 6 by means of rollers 21, 22, in which one of the rollers is driven.

Figure 5:
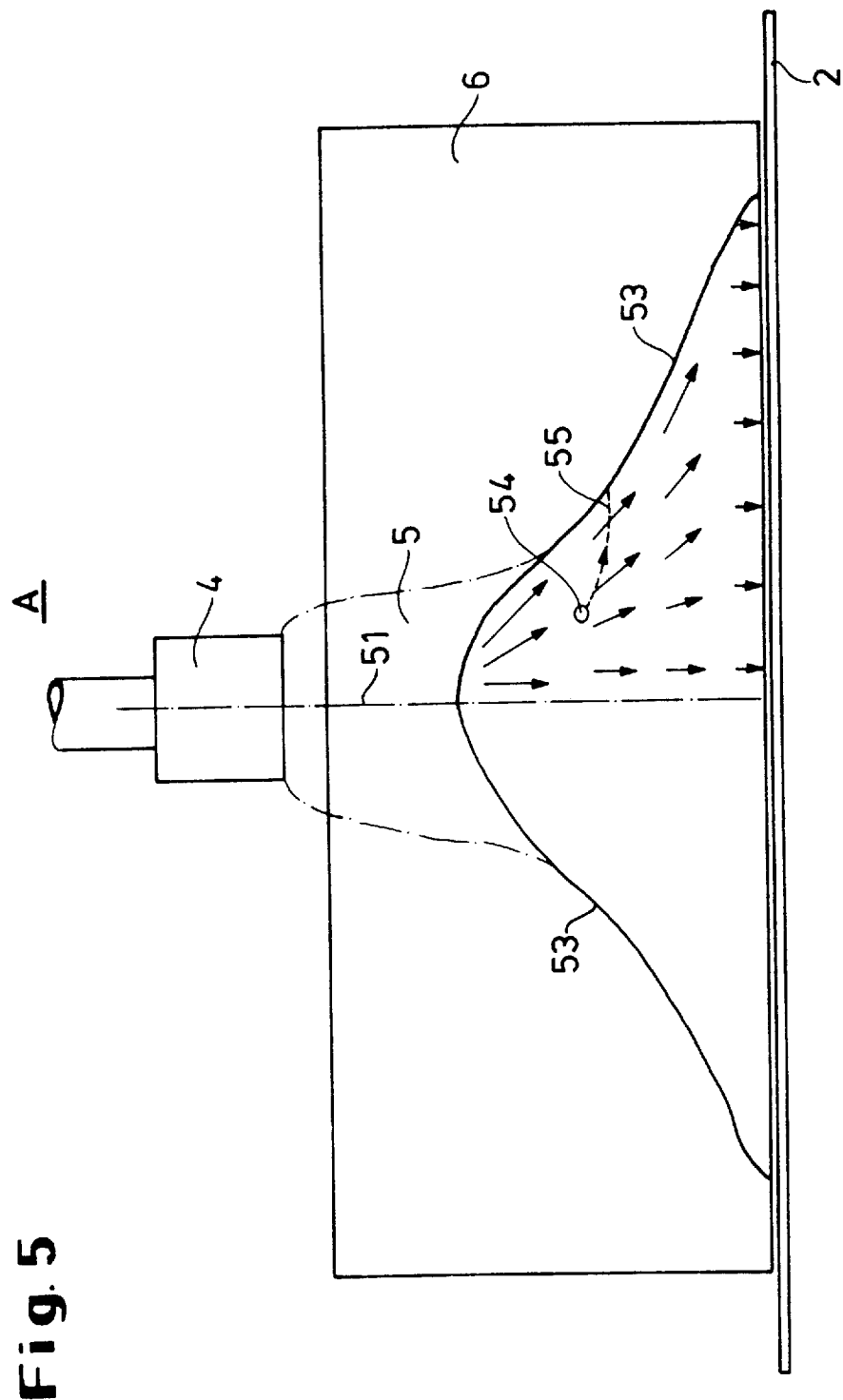
FIG. 5 shows the flowing of the froth along the barrier and the escape of large bubbles of gas from the froth.

FIG. 5 shows a view of the device in the direction of arrow A in FIG. 1. The reference numbers in FIG. 5 denote the same elements shown in FIG. 1. Based on the assumption that the barrier 6 is a pane of glass, the contour 53 of the froth becomes visible on the barrier 6. The arrows, which have been drawn inside the contour 53, indicate approximately the direction and speed of flow of the froth on the barrier 6. Due to the flowing of the froth on the barrier 6, the formation of a large bubble 54, possibly the result of an agglomeration of foam bubbles, follows the path along the dashed line 55 and emerges through the contour line 53 such that the large gas bubble 54 is not incorporated into the foam.

Figure 6:
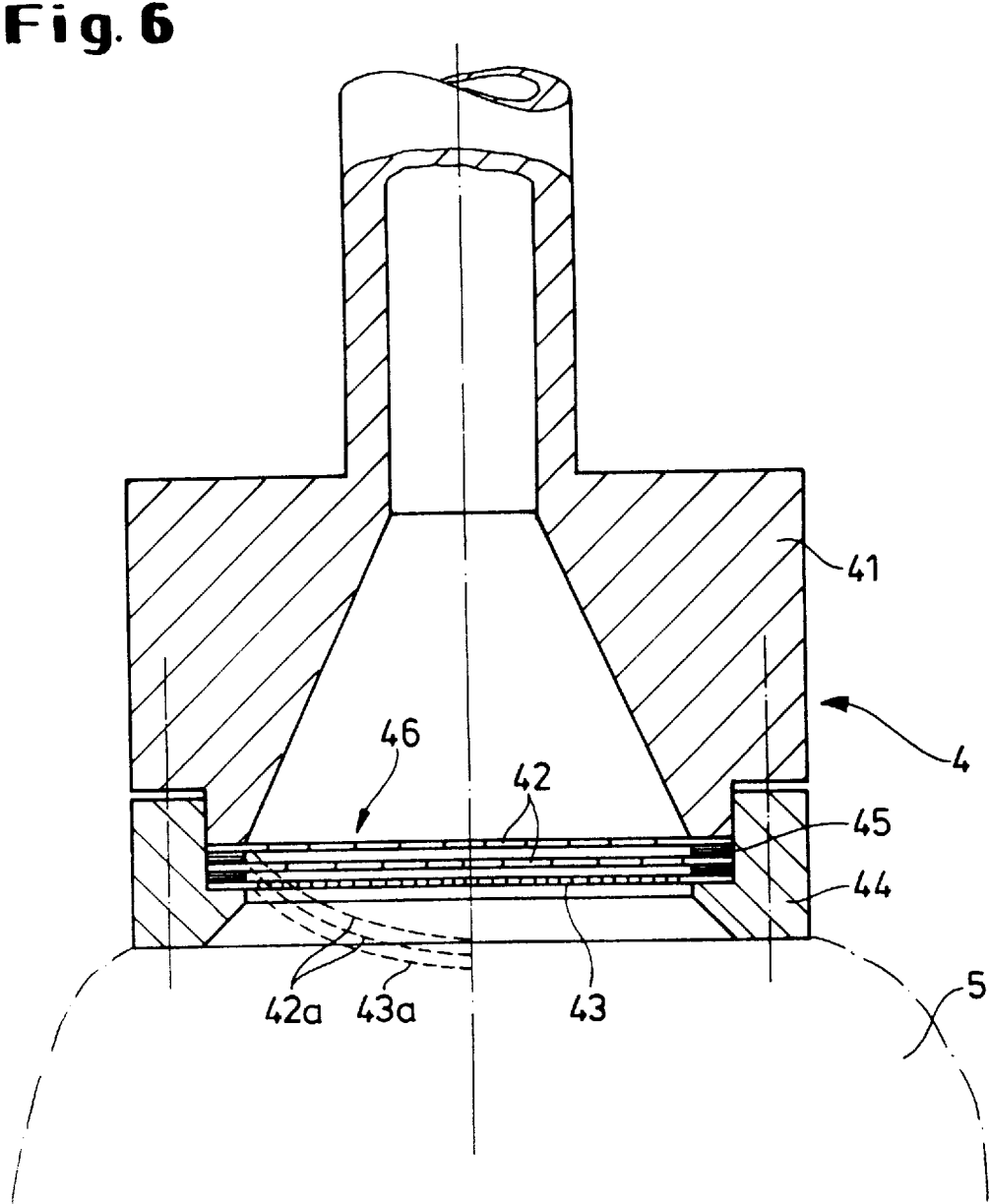
FIG. 6 shows, in cross-section, a pressure-reducing unit which can be employed in accordance with the present invention.

FIG. 6 shows an example of a pressure-reducing unit 4 which can be employed in accordance with the invention. The unit comprises a cylindrical casing 41, in which the polyurethane reaction mixture containing carbon dioxide in dissolved form is supplied from above at a pressure of, for example, 10 to 15 bar. Perforated plates 42, 43 are provided at the outlet and kept at a distance of 0.5 to 2 mm by means of a washer 45 and held to withstand pressure by flange 44. The perforated plates 42 comprise a plurality of bores 46 with a diameter of 0.1 mm which, in total, constitute a free cross-sectional passage area of 2% of the perforated plate 42. As the reactive mixture passes through the perforated plates 42, the pressure of the reactive mixture is reduced within an extremely short period. The additional perforated plate 43 has approximately 10 times as many bores having a diameter of 0.1 mm more than the perforated plates 42, which corresponds to a free passage area of 20%, resulting in the rate of passage through the perforated plate 43 of only one tenth of the rate of passage through the perforated plates 42. After passing through the perforated plate 43, the dissolved carbon dioxide is released from the reaction mixture within $10^{-2}$ to $10^{-4}$ seconds, during which time, the bell-shaped contour of the froth 5 forms. Instead of the flat sieve plates 42, 43, domed sieve plates 42a, 43a, as indicated in half-section, are preferably employed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethane foam comprising the following steps:

(a) applying froth onto a conveyor belt of a block-foam installation characterized in that said froth is in a free, substantially vertical fall;

(b) arranging a substantially vertical barrier transversely on said conveyor belt at an angle of less than 20° to prevent the flowing of said froth contrary to the direction of movement of said conveyor belt.

2. A process according to claim 1, wherein said froth is generated in a foaming device extending over less than 20 % of the width of said conveyor belt at a right angle to said conveyor belt; said foaming device being designed as a pressure-reducing unit and having a substantially symmetrical circular shape.

* * * * *